US006189342B1

(12) United States Patent
Berkey

(10) Patent No.: US 6,189,342 B1
(45) Date of Patent: Feb. 20, 2001

(54) METHOD OF MAKING SEGMENTED CORE OPTICAL WAVEGUIDE PREFORMS

(75) Inventor: George E. Berkey, Pine City, NY (US)

(73) Assignee: Corning Incorporated, Corning, NY (US)

( * ) Notice: Under 35 U.S.C. 154(b), the term of this patent shall be extended for 0 days.

(21) Appl. No.: 09/159,738

(22) Filed: Sep. 24, 1998

Related U.S. Application Data

(60) Provisional application No. 60/063,441, filed on Oct. 29, 1997.

(51) Int. Cl.⁷ .................................................. C03B 37/027
(52) U.S. Cl. .................................. 65/412; 65/421; 65/422
(58) Field of Search ............................. 65/412, 421, 422

(56) References Cited

U.S. PATENT DOCUMENTS

| | | | |
|---|---|---|---|
| 4,125,388 | 11/1978 | Powers | 65/3 |
| 4,235,615 | 11/1980 | Rau et al. | 65/3 |
| 4,629,485 | 12/1986 | Berkey | 65/3.11 |
| 4,668,263 | 5/1987 | Yokota et al. | 65/3.11 |
| 4,675,040 | 6/1987 | Tanaka et al. | 65/3.12 |
| 4,737,179 | 4/1988 | Tanaka et al. | 65/3.12 |
| 4,975,102 * | 12/1990 | Edahiro | 65/412 |
| 5,149,349 | 9/1992 | Berkey et al. | 65/3.11 |
| 5,152,818 * | 10/1992 | Berkey | 65/412 |
| 5,180,410 | 1/1993 | Berkey | 65/3.11 |
| 5,203,898 * | 4/1993 | Carpenter | 65/421 |
| 5,242,476 * | 9/1993 | Bartel | 65/412 |
| 5,702,497 * | 12/1997 | Oh | 65/412 |
| 5,769,921 * | 6/1998 | Yokokawa | 65/412 |

FOREIGN PATENT DOCUMENTS

| | | |
|---|---|---|
| 0 249 230 A1 | 12/1987 | (EP). |
| 0 276 311 A1 | 8/1988 | (EP). |
| 0 718 244 A2 | 6/1996 | (EP). |
| 2038311 | 7/1980 | (GB). |
| 53-32042 * | 3/1978 | (JP) .................................. 65/412 |
| 55-47236 * | 4/1980 | (JP) .................................. 65/412 |
| 57-92536 * | 6/1982 | (JP) .................................. 65/412 |
| 2-29339 * | 12/1990 | (JP) .................................. 65/412 |
| 98/33746 | 8/1998 | (WO). |

OTHER PUBLICATIONS

H. Suda et al., "Transmission Loss in Low Grade SiCl₄ V.A.D. Fibres", Oct. 19, 1980, Electronics Letters, vol. 16, No. 21, pp. 802–803.
Abstract of 02–180727 JP Jul. 13, 1990.

* cited by examiner

Primary Examiner—John Hoffmann
(74) Attorney, Agent, or Firm—Scott S. Servilla; Randall S. Wayland

(57) ABSTRACT

A method of making a segmented core optical waveguide preform for making fiber that is resistant to attenuation increases due to hydrogen and heat aging. A first core region comprising a silica glass rod containing at least a first dopant is inserted into a central opening of a second core region comprising silica soot containing a second dopant. The first core region and second core region are consolidated together to form a segmented core region and cladding is deposited on the outer surface of the segmented core region.

18 Claims, 5 Drawing Sheets

METHOD OF MAKING SEGMENTED CORE OPTICAL WAVEGUIDE PREFORMS

This application is related to U.S. provisional application No. 60/063,441 filed on Oct. 29, 1997.

BACKGROUND OF THE INVENTION

This invention relates to a method of making an optical waveguide preform. More specifically, the method of the present invention is useful for making low loss optical waveguides, especially waveguide fibers having a segmented core profile.

Optical fibers having refractive index profiles such as W-profiles, segmented core profiles, and the like possess desirable dispersion characteristics. See U.S. Pat. Nos. 4,715,679 and 5,031,131 for teachings of various kinds of dispersion modified optical fibers. Fibers having these kinds of refractive index profiles have often been made by chemical vapor deposition (CVD) processes such as plasma CVD processes that are capable of forming single-mode fibers the cores of which include layers of different refractive indices. Such processes produce relatively small preforms. It is advantageous to form dispersion modified optical fiber preforms by outside vapor deposition (OVD) processes which produce relatively large preforms or draw blanks to decrease the cost of making the fiber.

A typical OVD process for forming such fibers is disclosed in U.S. Pat. No. 4,629,485. In accordance with that patent, a germania-doped silica rod is formed and stretched to decrease its diameter. A piece of the rod is used as a mandrel upon which pure silica glass particles or soot is deposited. The resultant composite structure is heated in a consolidation (drying and sintering) furnace through which a fluorine-containing gas flows. The soot is therefore doped with fluorine and sinters on the rod. One or more additional layers of glass are formed on the outer surface of the fluorine-doped silica layer to form a blank from which a fiber can be drawn.

When soot is sintered in accordance with the aforementioned method, whereby fluorine is supplied to the porous preform solely by way of the fluorine-containing muffle gas, the fluorine concentration (as measured by the $\Delta$ of the fluorine-containing layer) is not sufficient to provide certain desirable optical characteristics. The typical fluorine concentration achieved with muffle gas doping provides a $-0.4\%$ $\Delta$ when $CF_4$ is the fluorine-containing constituent. The maximum delta value for $CF_4$ produced by the above-described process is $-0.5\%$ $\Delta$.

As used herein, the term $\Delta_{a-b}$, the relative refractive index difference between two materials with refractive indices $n_a$ and $n_b$, is defined as $$\Delta_{a-b} = (n_a^2 - n_b^2)/(2n_a^2) \qquad (1)$$

For simplicity of expression, $\Delta$ is often expressed in percent, i.e. one hundred times $\Delta$. In this discussion, $n_a$ is the refractive index of the fluorine-doped glass and $n_b$ is the refractive index of silica.

When a fluorine-doped silica tube is collapsed onto a germania-doped silica rod, or when a germania-doped silica tube is collapsed onto a fluorine-doped silica rod, it is extremely difficult to achieve a satisfactory interface between those two members. This is so because the interface typically contains many seeds, and much of the resultant preform or blank produces unusable optical waveguide. Such seed formation is less prevalent when members formed of other glass compositions such as a fluorine-doped silica tube and a pure silica rod are fused to form a preform.

U.S. Pat. No. 4,675,040, discloses inserting a core glass rod made of pure silica into a soot tube of cladding material made of pure silica doped with fluorine and sintering the core/clad structure to fuse the cladding over the pure silica core. U.S. Pat. No. 4,668,263 discloses a method for collapsing a silica tube having a fluorine-doped inner layer onto the surface of a silica rod. In accordance with that patent the collapse step is accomplished by rotating the tube and heating it with the flame from a longitudinally traveling burner. That technique could not be employed to make dispersion modified fiber designs of the type that utilize the entire fluorine-doped tube, including the outer surface, as part of the core region or light propagating region of the fiber. The reason for this is that, because the flame wets the glass, i.e. introduces hydroxyl contamination, the resultant fiber would be rendered unsuitable for operation at wavelengths where attenuation due to hydroxyl ions is large. A further disadvantage of this method concerns the temperature of the flame, which is not lower than 1900° C. At such high temperatures, control of the process becomes difficult. The axis of the preform can become non-linear or bowed. If the core rod is a soft glass such as a germania-doped glass, the rod can become softer than the tube; this can result in an out-of-round core or a core that is not concentric with the outer surface of the resultant fiber.

U.S. Pat. No. 4,846,867 discloses a method for collapsing a fluorine-doped silica tube onto the surface of a silica rod. Prior to the tube collapse step, a gas phase etchant is flowed through the gap between the rod and tube while the tube is heated by a flame. In the specific examples, wherein $SF_4$ is the etchant, a gaseous mixture of $SF_6$, $Cl_2$ and oxygen (ratio 1:1:6 by volume) is introduced through a gap between the rod and the tube. Such a gaseous mixture removes glass from the treated surfaces of the rod and tube, thus forming new surfaces at the rod/tube interface. The chlorine is present in an amount sufficient to remove water generated by the fluorine-containing etchant. The outer surface of the resultant preform is thereafter coated with silica soot particles that are dried, doped with fluorine and then sintered to form a blank from which an optical fiber is drawn. The flame that was directed onto the tube during the gas phase etching step introduces water into the outer surface of the tube. The attenuation of the fiber resulting from that water is high. The attenuation at 1380 nm for one example is 30 dB/km which is attributed to contact of the oxyhydrogen flame with the preform.

Copending U.S. patent application Ser. No. 08/795,687, filed on Feb. 5, 1997, entitled "Method of Making Optical Fiber Having Depressed Index Core Region," discloses a method for inserting a germania doped silica glass rod into a fluorine doped silica glass tube to form an assembly and consolidating the assembly to form a seed free interface. The tube may be overclad with cladding material such as pure silica. It has been discovered that while this method avoids a seed free interface between the consolidated germania-doped silica and fluorine-doped silica interface, it is difficult to control attenuation increases due to hydrogen and heat aging in fibers drawn from preforms made by this method. As used herein, the term "hydrogen aging" refers an attenuation increase in an optical waveguide that has been exposed to an atmosphere containing hydrogen at a certain concentration, pressure and temperature. The term "heat aging" refers to an attenuation increase exhibited by an optical waveguide that has been exposed to heat.

In view of the disadvantages discussed above, it would be desirable to provide a method for producing a segmented core optical waveguide preform that allowed the entire light active region of waveguide preform blank to be dried from the inside of the blank. In addition, it would be particularly advantageous to provide a dispersion modified optical waveguide that had low attenuation and exhibited minimal or no attenuation increase due to heat or hydrogen aging.

SUMMARY OF THE INVENTION

The present invention relates to a method of making a an optical waveguide preform having a segmented core region. The method comprises providing a first core region comprising a glass rod, preferably a silica glass rod, the first core region containing at least a first dopant, preferably a dopant for decreasing the refractive index of the silica glass rod, such as fluorine. The method further comprises depositing silica soot containing a second dopant on a mandrel, removing the mandrel to provide a soot blank having a central opening therethrough to provide a second core region. The second dopant contained in the silica soot is preferably an index increasing dopant such as germania. The method also comprises inserting the first core region into the central opening of the second core region together in a furnace to provide the segmented core region of the waveguide preform. The method further includes the step of depositing a cladding comprising silica soot on the outer surface of the segmented core region of the waveguide preform.

In one embodiment of the invention, the step of providing the first core region may further comprise inserting the glass rod into a silica glass tube containing the first dopant to provide an assembly, inserting the assembly into a furnace, heating the assembly, and collapsing the tube onto the rod in the furnace. Preferably, a gas selected from the group consisting of 100% chlorine and chlorine mixed with diluent gas is flowed into the first end of the tube, between the tube and the rod, and to the second end of the tube before the tube is collapsed onto the rod. The rod is preferably a silica glass rod containing a dopant such as germania to increase the refractive index of the glass.

The tube collapse step can be performed in the same furnace in which the chlorine gas flowing step occurs. Advantageously, as the adjacent surfaces of the rod and tube are cleaned by the gas while the assembly is in a furnace, the outer surface of the tube is not contaminated by water that would be present if a flame were employed for heating the assembly during the gas flowing step. This method is especially suitable for forming an optical fiber having a core that includes an annular region of depressed refractive index, as disclosed in copending United States patent application entitled, "Dispersion Managed Optical Waveguide Fiber," filed on the same date as the present application, fibers having W-profiles, and segmented core fibers.

A particular advantage of the method (of the present invention is that preform that the entire light active region of a waveguide preform blank can be dried from the inside of the blank. Applicant has discovered that dispersion modified optical waveguide fibers made by the method of the present invention exhibit minimal or no attenuation increase due to heat or hydrogen aging. Additional features and advantages of the invention will be set forth in the description which follows. It is to be understood that both the foregoing general description and the following detailed description are exemplary and explanatory and are intended to provide further explanation of the invention as claimed.

DETAILED DESCRIPTION

The method of this invention may be employed to produce an optical waveguide preform having a segmented core index profile. Generally, this method comprises (a) providing a first core region containing at least a first dopant, (b) providing a second core region made by depositing silica soot containing a second dopant on a mandrel and removing the mandrel to provide a soot blank having a central opening therethrough, (c) inserting the first core region into the opening in the second core region and consolidating the first core region and second core region together in a furnace to provide the segmented core region of the waveguide preform and (d) depositing on the outer surface of the core region cladding comprising silica soot. The core of the resultant fiber drawn from the waveguide preform includes the inner core region and an outer core region, and each core region optionally includes additional annular core regions. As used herein, the term "core" refers to the light active area of the waveguide, i.e. the region of the waveguide through which light is transmitted.

Steps (a) through (d) are not necessarily performed in the stated order. In one embodiment, a silica glass rod containing a dopant to decrease the refractive index of the glass is the first core region. In an alternative embodiment, the step of providing the first core region 22 comprises collapsing a glass tube 20 over a glass rod 21 (See FIG. 5) depositing soot onto the core region, with the rod and tube assembly initially being exposed to a chlorine gas at temperature sufficient to achieve cleaning of the rod surface and inner surface of the tube. After the chlorine cleaning, the temperature is then increased collapse and fuse the tube to the rod in a dry furnace.

Figure 1:
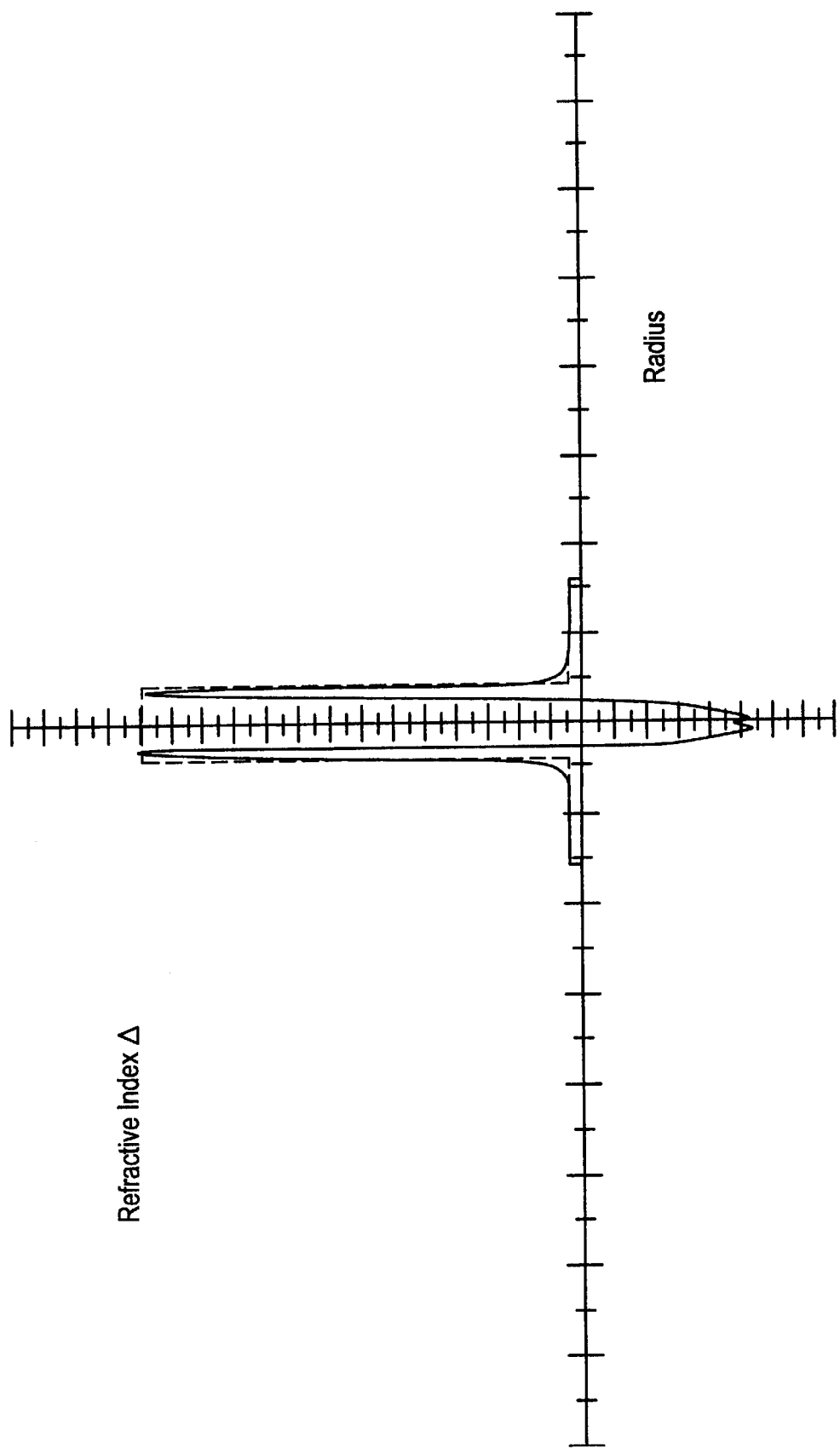
FIG. 1 illustrates an exemplary refractive index profile of an optical fiber that may be produced by the method of this invention.

One embodiment of the invention involves producing an optical waveguide fiber having a refractive index profile in which a central region of the core has a lower refractive index than an annular region of the core surrounding the central region. FIG. 1 shows an exemplary refractive index profile of a waveguide fiber produced by the method of the present invention. In this embodiment, the first core region 22 comprises a glass rod, preferably a silica glass rod containing a dopant. The dopant preferably decreases the refractive index of the silica glass. Fluorine is the preferred dopant since attenuation due to $B_2O_3$ limits fiber usage to wavelengths less than about 1200 nm.

The first core region may be made by any suitable method for making a waveguide core such as OVD, VAD, etc. For example, a fluorine doped rod may be made by depositing a pure silica blank on a 0.25 inch or larger alumina mandrel. The mandrel is removed to provide a central opening down a central region of the blank, and the blank may be consolidated with about 70 cc of $CF_4$ to dope the blank with fluorine, 66 ccm (cubic centimeters per minute) of chlorine and 1 liter of helium down the central opening. The blank may then be incrementally exposed to a temperature of at least about 1900° C., preferably about 2050° C. and stretched to form a solid fluorine doped rod. The diameter of the rod will depend on the desired index profile of the fiber that is formed from the preform blank. For example, the fluorine doped silica glass rod may be stretched to a diameter of about 8 mm.

Figure 3:
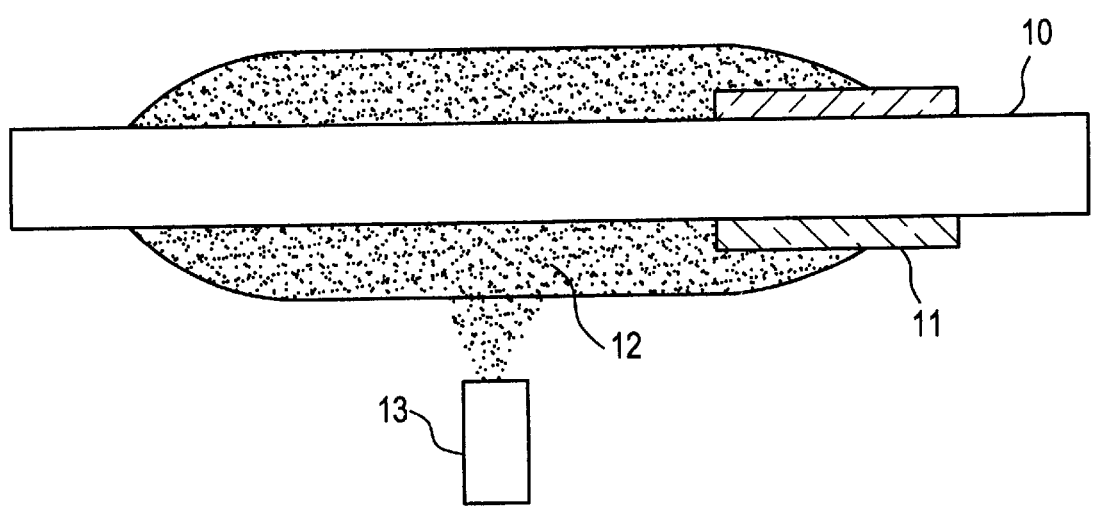
FIG. 3 illustrates formation of a porous glass preform on a mandrel.

As shown in FIG. 3, a second core region of the waveguide preform is formed by depositing silica soot containing a second dopant on a relatively large diameter mandrel 10 and removing the mandrel to provide a soot blank having a central opening therethrough. Prior to the deposition step, mandrel 10 is inserted through tubular handle 11. While mandrel 10 rotates, it also undergoes translational motion with respect to soot generating burner 13, whereby a porous glass preform 12, which may serve as the second core region, is built up on the mandrel. The mandrel 10 has a large enough diameter to produce a tube structure having a sufficiently large inner diameter to be useful in later steps of the method. For example, an alumina mandrel having a diameter of 0.25 inches or larger is sufficient. The mandrel may be in the form of a rod or rod or tube. U.S. Pat. No. 5,180,410, the contents of which are relied upon and incorporated by reference, includes a detailed description on forming porous preforms on tubular mandrels, which may be useful for performing the step of providing a tubular porous preform that may be doped during consolidation in accordance with the method of the present invention.

As noted above, during deposition of the second core region, the mandrel rotates and also undergoes translational motion with respect to a soot generating burner to build up a soot preform on the mandrel. The second dopant is preferably a dopant to increase the refractive index of silica, such as germania. The amount of dopant in the second core region will depend on the desired refractive index profile of the waveguide formed from waveguide preform.

Figure 4:
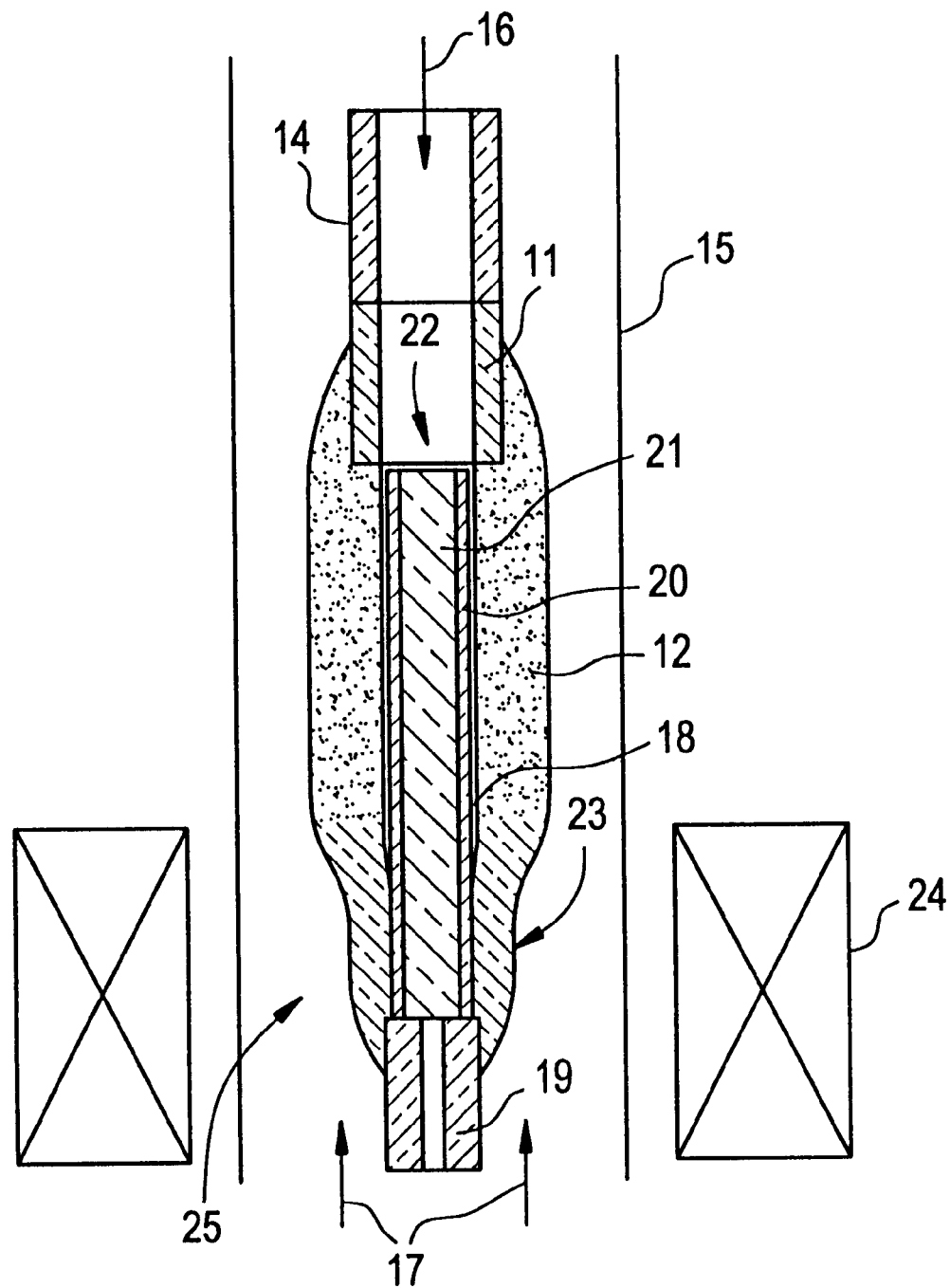
FIG. 4 illustrates sintering of a porous glass preform.

As shown in FIG. 4, after the mandrel 10 has been removed from second core region 12 to provide a second core region having a central opening 18 therethrough, a handle 14 may be attached to one end of the second core region 12 to allow the second core region soot blank to be suspended in a consolidation furnace. Preferably, the handle 14 is a standard ball joint handle 14 that is fused to handle 11, and the assembly including second core region 12 is suspended in consolidation furnace 15 by that handle. The first core region comprising the fluorine doped glass rod is inserted into the central opening 18 through the second core region. The rod may be suspended within the second core region soot blank any suitable method such as making a standard small ball at one end of the rod and suspending the ball inside the handle at the end of the second core region soot blank (not shown). The first core region and second core region may be placed together in a furnace at a temperature of about 1000° C. to about 1100° C., flowing helium at about 1 liter per minute and about 60 cubic centimeters per minute of chlorine between the central opening in the second core region and the first core region for about 1 hour in the direction of arrow 16. Muffle gas, preferably containing helium, is flowed into the furnace as indicated by arrows 17. The end of the second core region 12 may optionally contain a capillary tube 19. The first core region and second core region are then consolidated together for about one hour by incrementally lowering the first core region and second core region assembly at a rate of a about 5 mm per minute into the zone 25 of a furnace at a temperature of at least about 1400° C., preferably about 1500° C, generated by a heater 24 to form the consolidated core region 23.

Figure 5:
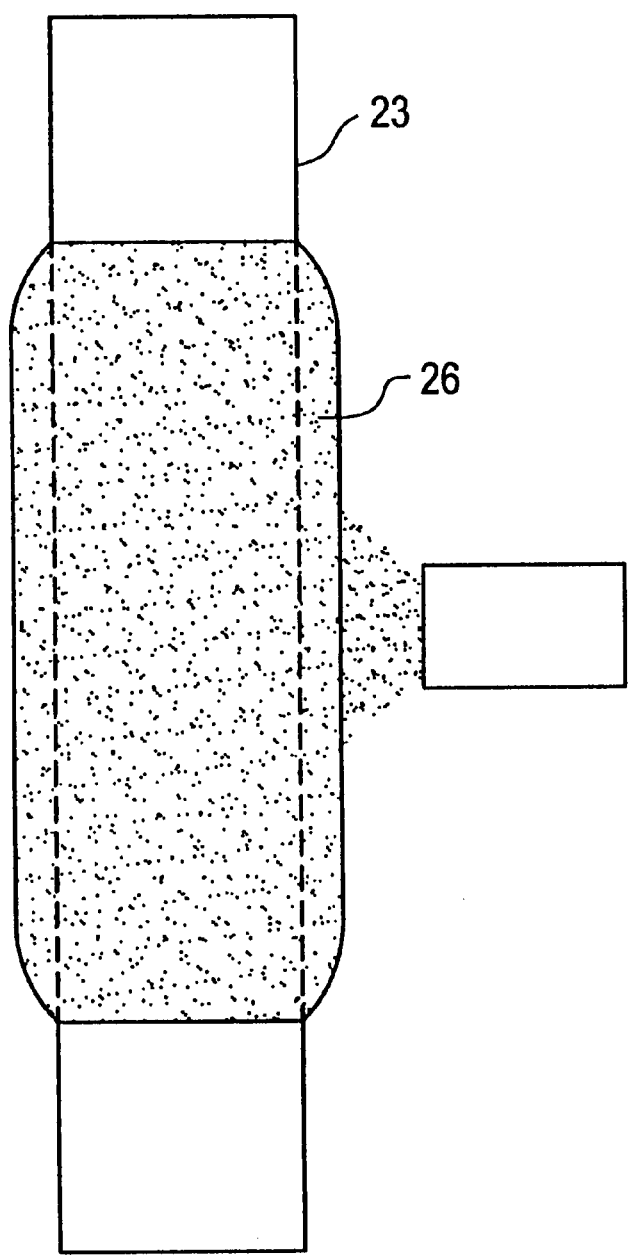
FIG. 5 illustrates depositing soot onto the core region.

After consolidation of the first and second core regions to provide the segmented core region of the preform blank a standard ground joint handle is fused to one end and cladding material comprising silica may be deposited on the outer surface of the segmented core region of preform as illustrated in FIG. 5. Before depositing cladding material, the segmented core region may be heated to a temperature of at least about 2050° C., preferably about 2050° C. and stretched to a diameter suitable for the overcladding step.

In an alternative embodiment, the step of providing the first core region may include additional steps. Dispersion modified fiber having a more complicated refractive profile may require further processing steps to achieve the more complicated index profile. An exemplary refractive index profile for a dispersion compensating optical waveguide fiber is shown in FIG. 2.

Figure 2:
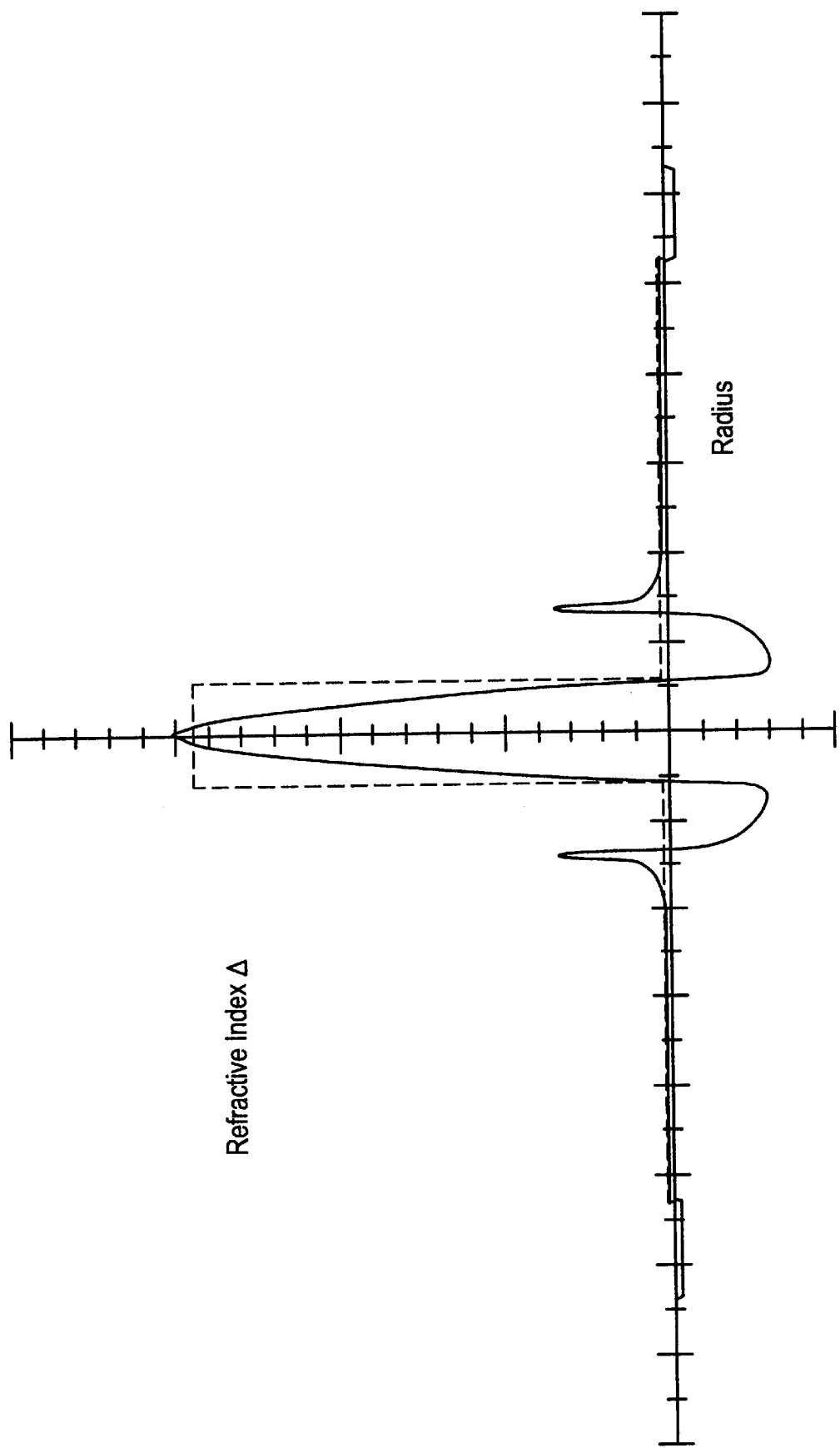
FIG. 2 illustrates an exemplary refractive index profile of an optical fiber having a depressed index core region that may be produced by the method of this invention.

The index profile shown in FIG. 2 may be provided by the method of present invention. In this embodiment, the step of providing first core region includes inserting a silica glass rod into a silica glass tube containing at least a first dopant to provide an assembly. Preferably, the silica glass rod contains a dopant such as germania, $P_2O_5$ or the like to increase the refractive index of the silica glass rod. The rod can be formed by any one of various known techniques such as modified chemical vapor deposition (MCVD), vapor axial deposition (VAD) and outside vapor deposition (OVD), depending upon its desired refractive index profile. The at least first dopant contained in the tube is preferably a dopant such as fluorine to decrease the refractive index of the tube. The tube/rod assembly is inserted into a furnace at a temperature of about 1000° C. to about 1100° C. Drying gas selected from the group consisting of 100% chlorine and chlorine mixed with a diluent gas such as helium is flowed through one end of the tube, between the tube and the rod and to the second end of the tube for one hour to clean the outer surface of the rod and inner surface of the tube.

The drying gas conventionally comprises a mixture of chlorine and an inert gas such as helium. Although the flowing gas stream could contain a diluent such as helium, 100% chlorine is preferred for cleaning purposes. The gas streams consist of dry gases, whereby no water is present in the vicinity of assembly during heat treatment. Gases can be purchased dry; moreover, the helium used for the muffle gas is also run through a drier.

The diameter of the rod is advantageously slightly smaller than the inner diameter of tube, allowing the chlorine to flow downwardly around the entire periphery of the rod. The chlorine acts a hot chemical cleaning agent. The chlorine cleaning step is more effective at high temperatures. It is preferred that the temperature of the cleaning step be at least about 1000° C. to about 1500° C., since at lower temperatures, the duration of the step would be sufficiently long that the step would be undesirable for commercial purposes. Obviously, lower temperatures could be employed if processing time were not a concern. The flow of hot chlorine between the tube and rod is very beneficial in that it allows the surfaces of the two members to be brought together without the formation of seeds at their interface. Seeds include defects such as bubbles and impurities that can produce attenuation in the resultant optical fiber.

After flowing the drying/cleaning gas for about an hour, one end of the tube/rocd assembly is incrementally lowered into a zone of a furnace at least about 1900° C., preferably about 2050° C., and the tube is collapsed onto the rod and stretched to an appropriate diameter to be inserted into the central opening through the second core region. The top end of the rod may provided with an enlarged end which is suspended from a narrow region at or near the handle of the tube. A vacuum source is connected to the handle. The bottom tip of the tube/rod assembly is heated in the zone of the furnace to a temperature of about 2050° C. As the tip of assembly passes through furnace zone, the diameter of the assembly decreases, and the tube collapses onto the rod and the space between those two members becomes evacuated. The assembly may be drawn elongate the assembly into a first core region in which the tube is fused to the rod.

The first core region may then be inserted into the central opening of the second core region as described above with respect to the previous embodiment. The remaining processing steps of providing a second core region, inserting the first core region into a central opening through the second core region, and providing a cladding layer comprising silica are similar to the steps previously described in the embodiment described above.

A fluorine-doped glass tube used in the step of making the first core region may be made by inserting a mandrel through tubular handle. The mandrel has a relatively large diameter in order to produce a tube having a sufficiently large inner diameter to be useful for receiving the silica glass rod. While the mandrel rotates, it also undergoes translational motion with respect to a soot generating burner, whereby a porous glass preform is built up on the mandrel.

The mandrel is removed from porous glass soot preform to provide a tubular preform having a central opening therethrough. A standard ball joint handle is fused to the tubular handle, and the preform is suspended in consolidation furnace by the ball joint handle. Sintering is performed in an atmosphere that includes a fluorine-containing centerline gas such as $SiF_4$, $CF_4$, $C_2F_6$, or the like. $SiF_4$ tends to give higher levels of fluorine doping (typically producing a $-0.7\%$ $\Delta$ and occasionally producing a delta of about $-0.8\%$), but that dopant causes elevated water levels in the resultant glass. Such elevated water levels in the fluorine-containing glass can be tolerated if the fiber core has a relatively high $\Delta$-value with respect to the silica cladding, whereby little power propagates in the annular fluorine-containing region of the fiber. $CF_4$ results in dryer glass but does not give the high dopant levels that can be obtained by using $SiF_4$.

High concentrations of fluorine can be used in this process because porous soot preform is formed of pure silica, i.e. there is no dopant such as germania that could be disadvantageously diffused within the blank. The resultant sintered tube contains a relatively high fluorine concentration since fluorine-containing gas is flowed into the central opening in the tube and outwardly through the pores of the porous glass preform whereby it achieves maximum contact with the entire body of porous glass. The muffle gas preferably contains a diluent gas such as helium and a sufficient amount of chlorine to dry the preform.

The centerflow gas also preferably contains one or more diluent gases such as helium and chlorine. The flow of chlorine can be discontinued after the desired water content has been achieved and before the porous preform sinters. The resultant fluorine-doped tube can be stretched or redrawn to decrease the inside diameter to the desired size. If the tube is stretched, it can then be cut to lengths suitable for the deposition of soot thereon.

A boron-doped tube is simpler to make than a fluorine-doped tube. For example, a porous $SiO_2$—$B_2O_3$ preform could be formed on a mandrel as described above with respect to the fluorine doped tube, $BCl_3$ being fed to the burner along with $SiCl_4$. The mandrel is removed, leaving a longitudinal central opening, and the preform is placed into a consolidation furnace. A muffle gas of 40 standard liters per minute (slpm) helium flows upwardly through the furnace muffle, and gases of 1 slpm helium and 75 standard cubic centimeters per minute (sccm) chlorine flows into the central opening. After the preform is dried, it is sintered. The resultant tube can be stretched as described above.

A more detailed description of making porous preforms, forming core rods, doping porous preforms and attaching handles to preforms may be found in copending U.S. patent application Ser. No. 08/795,687, filed on Feb. 5, 1997, entitled "Method of Making Optical Fiber Having Depressed Index Core Region," the contents of which are relied upon and incorporated by reference.

Waveguide fibers produced by the method of the present invention exhibit low attenuation as a result of the low seed count at the interface between the first core region and the second core region. Attenuation at the water peak of about 1380 nm for fibers made by the method of the present invention is low since the tube is not heated by a flame. Fibers produced by the method of this invention exhibit about 1 dB/km excess loss at the water peak of about 1380 nm.

Fibers made by the method of the present invention also exhibit low heat and hydrogen aging. Heat aging was measured by exposing fibers produced according to the present invention to 200° C. for 24 hours, and the fibers exhibited an attenuation of less than about 0.02 dB/km. Hydrogen aging was measured by exposing fibers made by the method of the present invention to 85° C. for 1 week at about 1% hydrogen, and the fibers exhibited an attenuation of less than about 0.03 dB/km. Thus fibers produced according to the present invention exhibit excellent resistance to hydrogen and heat aging. An advantage to fibers produced according the present invention is that the fibers do not require a hermetic coating to prevent hydrogen and heat aging.

It will be apparent to those skilled in the art that various modifications and variations can be made to the method of the present invention without departing from the spirit or scope of the invention. Thus, it is intended that the present invention cover the modifications and variations of this invention provided they come within the scope of the appended claims and their equivalents.

I claim:

1. A method of making an optical waveguide preform having a core region comprising the steps of:

providing a first core region comprising a glass rod, the first core region containing at least a first dopant;

depositing silica soot containing a second dopant on a mandrel, removing the mandrel to provide a soot blank having a central opening therethrough to provide a second core region;

inserting the first core region into the central opening in the second core region and consolidating the first core region and second core region together in a furnace to provide the core region of the waveguide preform, the core region having an outer surface; and depositing cladding comprising silica soot on the outer surface of the core region.

2. The method of claim 1, wherein the glass rod is a silica glass rod and the at least first dopant decreases the refractive index of the silica glass.

3. The method of claim 2, wherein the at least first dopant comprises fluorine.

4. The method of claim 3, wherein the second dopant increases the refractive index of the second core region.

5. The method of claim 4, wherein the second dopant comprises germania.

6. The method of claim 5, wherein the optical waveguide preform is an optical waveguide fiber preform.

7. The method of claim 1, wherein the step of providing the first core region further comprises the steps of:

inserting the glass rod into a glass tube containing the at least first dopant to provide an assembly, inserting the assembly into a furnace, heating the assembly, flowing a gas selected from the group consisting of 100% chlorine and chlorine mixed with a diluent gas into the first end of the tube, between the tube and the rod, and to the second end of the tube, and collapsing the tube onto the rod in the furnace.

8. The method of claim 7, wherein the glass tube is silica glass and the at least first dopant decreases the refractive index of the silica glass.

9. The method of claim 8, wherein the first dopant comprises fluorine.

10. The method of claim 9, wherein the second dopant increases the refractive index of the second core region.

11. The method of claim 10, wherein the second dopant comprises germania.

12. The method of claim 11, wherein the glass rod is a silica glass rod and contains dopant to increase the refractive index of the silica glass.

13. The method of claim 12, wherein the dopant contained in the rod comprises germania.

14. The method of claim 13, wherein the waveguide preform is an optical waveguide fiber preform.

15. A method of making a dispersion modified optical waveguide preform having a core region comprising the steps of:

inserting a silica glass rod containing a dopant to increase the refractive index of the silica glass into a silica glass tube containing a dopant to decrease the refractive index of the silica glass to provide an assembly, inserting the assembly into a furnace, heating the assembly to a temperature of at least about 1000° C., flowing a gas selected from the group consisting of 100% chlorine and chlorine mixed with a diluent gas into the first end of the tube, between the tube and the rod, and to the second end of the tube, and incrementally lowering the assembly into a furnace zone at a temperature of at least about 1900° C. to collapse the tube onto the rod to provide a first core region;

depositing silica soot containing a dopant to increase the refractive index of the silica on a mandrel, removing the mandrel to provide a soot blank having a central opening therethrough to provide a second core region;

inserting the first core region into central opening in the second core region and consolidating the first core region and second core region together in a furnace to provide the core region of the waveguide preform, the core region having an outer surface; and depositing cladding comprising silica on the outer surface of the core region.

16. The method of claim 15, wherein the dopant to increase the refractive index of the silica glass rod and the dopant to increase the refractive index of the silica soot comprises germania.

17. The method of claim 16, wherein the dopant to decrease the refractive index of the silica glass tube comprises fluorine.

18. The method of claim 17, wherein the optical waveguide preform is an optical waveguide fiber preform.

* * * * *